United States Patent
Unger

(10) Patent No.: US 9,610,627 B2
(45) Date of Patent: Apr. 4, 2017

(54) DIE FOR A JOINING TOOL, IN PARTICULAR FOR CLINCHING

(71) Applicant: Eckold GmbH & Co. KG, St. Andreasberg (DE)

(72) Inventor: Florian Unger, Bad Lauterberg (DE)

(73) Assignee: Eckold GmbH & Co, KG, St. Andreasberg (DE)

( * ) Notice: Subject to any disclaimer, the term of this patent is extended or adjusted under 35 U.S.C. 154(b) by 0 days.

(21) Appl. No.: 15/177,414

(22) Filed: Jun. 9, 2016

(65) Prior Publication Data

US 2016/0368038 A1 Dec. 22, 2016

(51) Int. Cl.
*B23P 19/00* (2006.01)
*B21D 39/03* (2006.01)
*B23P 19/06* (2006.01)
*B21J 15/02* (2006.01)

(52) U.S. Cl.
CPC ............ *B21D 39/031* (2013.01); *B21J 15/02* (2013.01); *B23P 19/062* (2013.01)

(58) Field of Classification Search
CPC ....... B21D 39/031; B23P 19/062; B21J 15/02
USPC ........................................................ 29/243.5
See application file for complete search history.

(56) References Cited

U.S. PATENT DOCUMENTS

| | | | |
|---|---|---|---|
| 2,925,748 A * | 2/1960 | Ross | B21J 15/02 173/121 |
| 4,569,111 A * | 2/1986 | Mutou | B21D 39/031 29/283.5 |
| 4,930,203 A * | 6/1990 | Obrecht | B21D 39/031 29/2.1 |
| 5,315,743 A * | 5/1994 | Schleicher | B21D 39/031 29/243.5 |
| 5,709,019 A * | 1/1998 | Sawdon | B21D 39/031 29/243.5 |
| 6,092,270 A * | 7/2000 | Sawdon | B21D 39/031 29/243.5 |
| 6,205,641 B1 * | 3/2001 | Brumley | B23P 19/062 100/229 R |
| 6,785,959 B2 * | 9/2004 | Sawdon | B21D 39/031 29/283.5 |

FOREIGN PATENT DOCUMENTS

| | | |
|---|---|---|
| DE | 30 01 671 A1 | 7/1981 |
| DE | 297 02 834 U1 | 6/1997 |
| DE | 102 21 247 A1 | 5/2002 |
| DE | 103 32 124 A1 | 2/2005 |
| DE | 10 2010 020 666 A1 | 11/2011 |

* cited by examiner

*Primary Examiner* — David B Jones
(74) *Attorney, Agent, or Firm* — Whitham, Curtis & Cook, P.C.

(57) ABSTRACT

A die for a joining tool, in particular for clinching, with an anvil (4) forming the bottom (41) of a swage (50), and with a spring sleeve (3) which surrounds the anvil (4) and has a plurality of slits (32) extending in an axial direction (A), said slits (32) permitting a radial expansion of the spring sleeve (3), is characterized in that bushing (1) which is arranged between the anvil (4) and the spring sleeve (3) and which is provided, at its free end (17), with inserts (2) which surround the anvil (4) and are made of a harder material than the bushing (1).

12 Claims, 6 Drawing Sheets

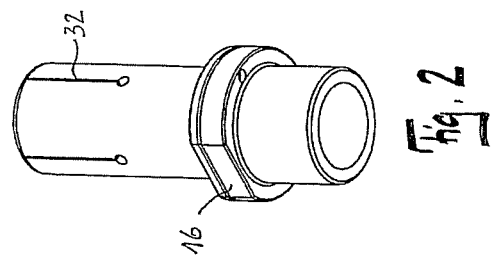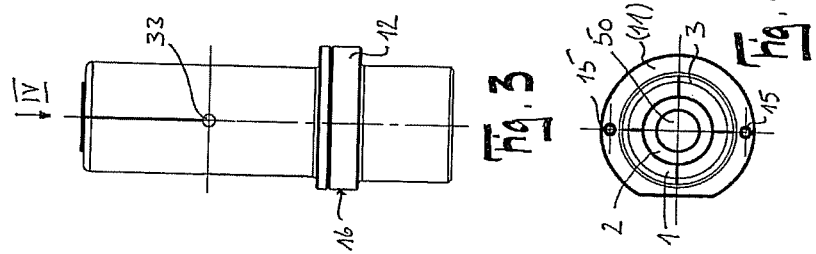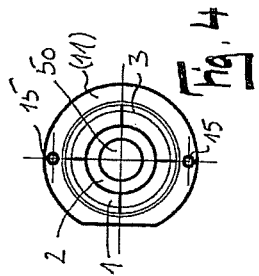

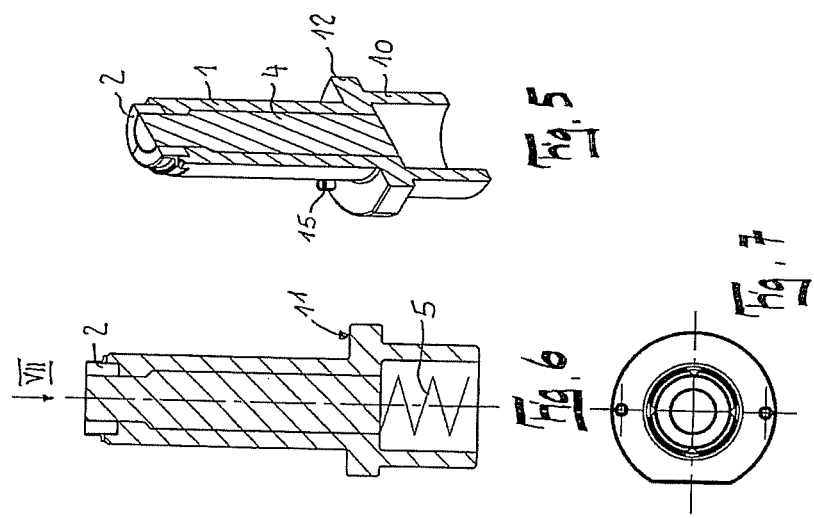
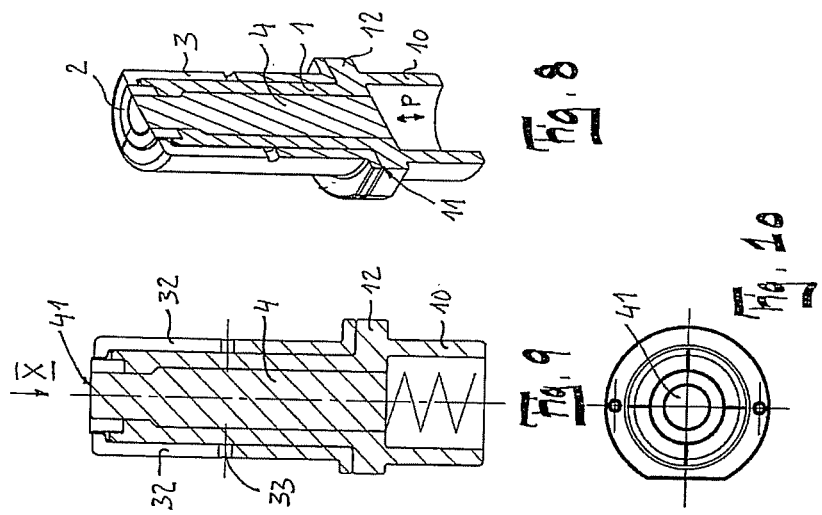

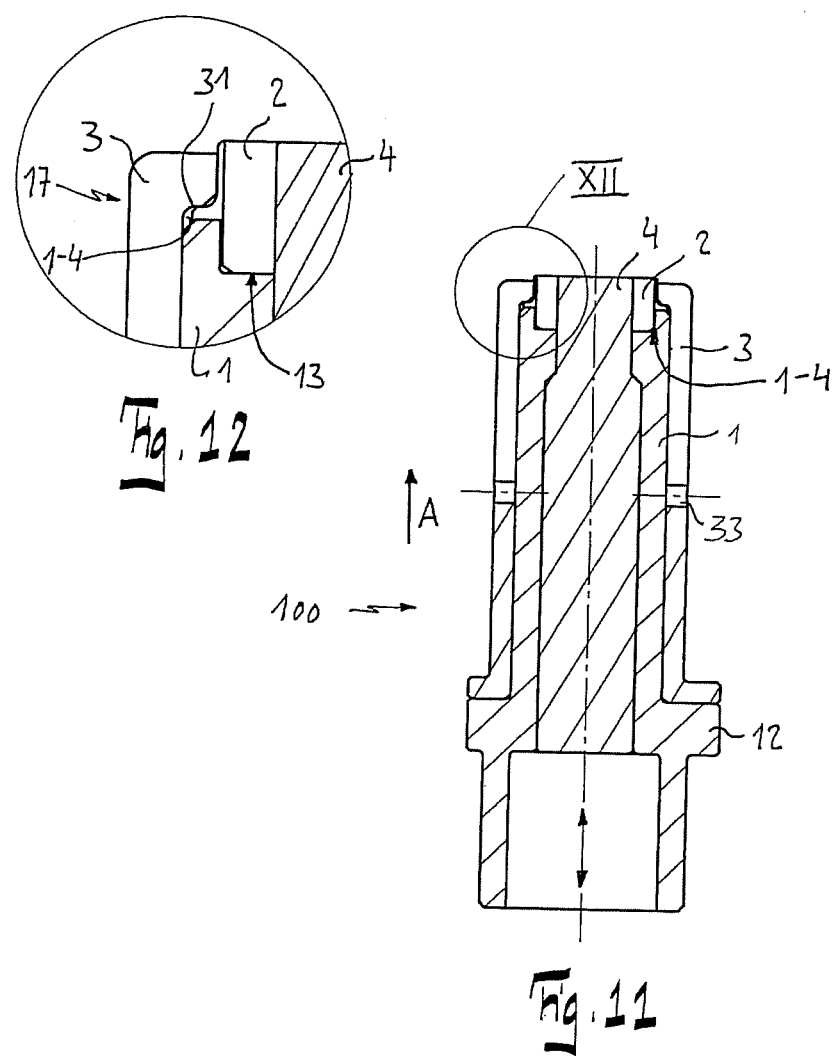

Fig. 13.1

DIE FOR A JOINING TOOL, IN PARTICULAR FOR CLINCHING

The invention relates to a die for a joining tool, in particular for clinching, with an anvil forming a bottom of a swage, and with a spring sleeve which surrounds the anvil and has a plurality of axial slits permitting a radial expansion of the spring sleeve.

A die of this kind is known from DE 10 2010 020 666 A1, for example.

In this die, the swage is formed by the head of the anvil and by the part of the spring sleeve protruding axially above the latter. The swage is radially elastic by virtue of the slit spring sleeve, such that an embossing portion is formed that can take up very high forces in the axial direction. The radial elasticity ensures that temporarily acting tangential stresses, which can lead to formation of fractures, do not occur during the connection process.

In order to permit the radial resiliency and at the same time to be able to form a stable wall of the swage, the spring sleeve has to be produced from a high-quality and therefore expensive material. Inevitable wear on the punching tools has the effect that at least the spring sleeve has to be replaced after a certain operating time.

DE 103 32 124 A1 discloses a device which consists of ram and die for connecting plate-shaped components, which device can be used to produce clinch connections or punched rivet connections. In the die formed in this device, the swage is formed by the anvil and by radially resilient support elements mounted on the anvil. The support elements are held via elastic elements that surround the anvil. By means of the ram movement, the structural parts to be connected to each other are stretch-drawn, deep-drawn and pressed. The material flows radially outward and, by a division and the resiliency of the support elements, the latter are displaced radially outward on one plane. After forming of the joining element, the return stroke of the ram to the starting position takes place and, after the joining process, the support elements are pushed back to their starting position on the head of the anvil by means of the elastic element.

In a die in which support elements bear on the head of the anvil, the depth of the swage does not form only during the joining which has the effect that the flowing material in the clinching is not slowly distributed in the swage, and instead it has to spread solely by the ram movement in the swage, as a result of which a high-quality connection cannot be generated in some circumstances.

DE 297 02 834 U1 discloses a device for punch riveting with a setting head which is provided with an elastic sleeve. The rivet is applied via the setting head. The rivet is centered in the elastic sleeve and held releasably after the riveting process.

DE 30 01 671 A1 describes a cold-process or semicold-process massive forming die consisting of a shrink ring with an optionally longitudinally divided die core having an interior or one or more shrink rings, in which an intermediate bushing is arranged between the die core and at least one shrink ring, which intermediate bushing is made of a material with high compressive strength and has at least two slits offset from each other and extending substantially in the axial direction.

DE 102 21 247 A1 discloses a clinching tool consisting of a two-part ram and a two-part die. One part serves as insert part for direct machining and the other part serves as receiving part for retention. The insert parts are made of a harder material than the receiving parts.

The object of the invention is to improve the die known from DE 10 2010 020 666 A1 such that the useful life is increased and the operating costs are reduced.

To achieve this object, a die of the type in question is characterized by a bushing which is arranged between the anvil and the spring sleeve and which is provided, at its free end, with inserts which surround the anvil and are made of a harder material than the bushing.

By means of this design, the swage is formed by the anvil and by the bushing surrounding the anvil, wherein the wall of the swage is formed by the inserts, which are made of the harder material, and the head of the anvil forms the bottom of the swage. The inserts, which can be made of a high-quality material, are subject to wear. They can be replaced without the bushing and/or the spring sleeve having to be replaced, such that high-quality material can be used in order to increase the useful life of the die and to keep down the costs that arise on account of the still inevitable wear. By means of this design, the manufacturing costs of the die are also reduced, which increases the competitiveness of the tool, since only the highly loaded parts of the swage are made of a hard material. Preferably, the inserts are arranged in an annular groove formed by the anvil and the bushing.

In order to secure the inserts in the die against falling out, each insert is preferably provided with at least one radially outwardly pointing projection, which engages in an undercut formed in the area of the free end of the sleeve.

The projection can extend in the circumferential direction around the entire wall of an insert, i.e. can be continuous in the circumferential direction.

Preferably, the anvil is displaceable in the axial direction with respect to the bushing, wherein the displaceability can take place counter to the force of a spring or can be effected by a hydraulic drive of the anvil.

Preferably, the bushing bears axially on a main body of the die, for which purpose in particular the main body preferably has one abutment which acts in the axial direction and which in particular and also preferably has at least one peg which protrudes in the axial direction in order to secure the bushing in terms of rotation, which peg engages in a corresponding recess provided in the bushing.

The bushing can also be formed in one piece with the main body. It is also possible for the anvil to be formed in one piece with the main body.

The invention will be explained in more detail below with reference to a drawing, in which:

FIG. 1 shows a die in a perspective view;
FIG. 2 shows the die according to FIG. 1 in a further perspective view;
FIG. 3 shows the side view of the die according to FIG. 1;
FIG. 4 shows the view of the die according to viewing arrow IV in FIG. 3;
FIG. 5 shows a section through the die without spring sleeve;
FIG. 6 shows a further sectional view;
FIG. 7 shows the view of the die according to viewing arrow VII in FIG. 6;
FIG. 8 shows a section through the die according to FIG. 1;
FIG. 9 shows a further section through the die;
FIG. 10 shows the view of the die according to viewing arrow X in FIG. 9;
FIG. 11 shows an enlarged sectional view through the die;
FIG. 12 shows the detail XII from FIG. 11;
FIG. 13 shows the section along the line XIII-XIII according to FIG. 14;

FIG. 13.1 shows detail XIII.1 according to FIG. 13 in an enlarged view;

Figure 13:
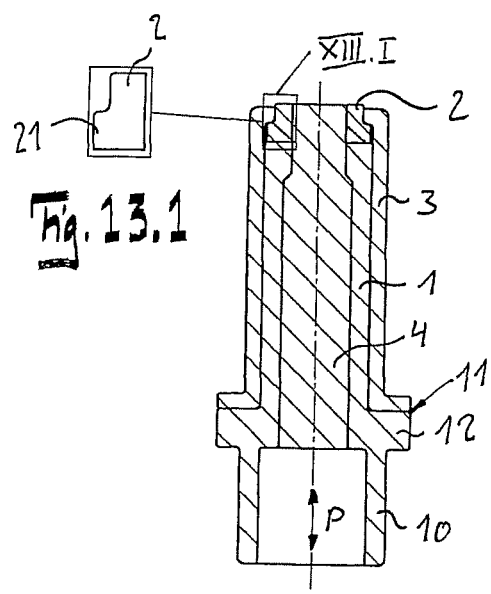
Figure 14:
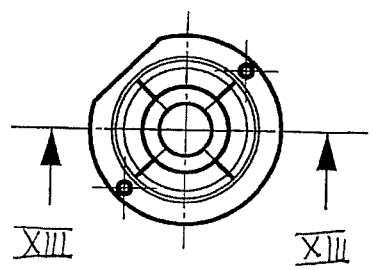
FIG. 14 shows a plan view of the die.
Figure 15:
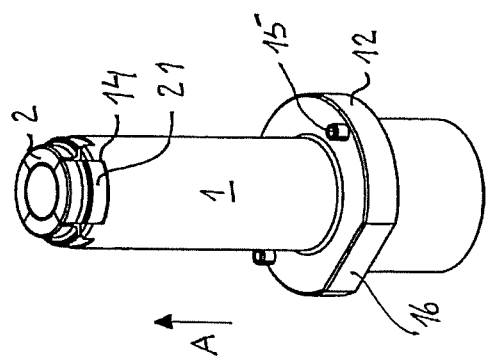
FIG. 15 shows a further perspective view of the die without spring sleeve.
Figure 16:
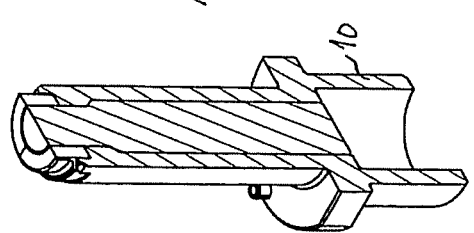
FIG. 16 shows a section through the die according to FIG. 15.
Figure 17:
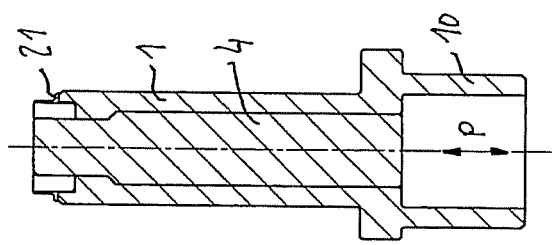
FIG. 17 shows a further section through the die according to FIG. 15.

The structure of the die 100 can be clearly seen from FIGS. 8 to 13. It consists of the main body 10, the bushing 1 preferably connected in one piece to the main body 10, and the spring sleeve 3 which surrounds the bushing 1 and bears on a shoulder 11 provided on the main body 10. The shoulder 11 is formed on a circumferential flange 12. The bushing 1 is a closed hollow cylinder and, at its end directed away from the shoulder 11, is provided with a milled cutout 13 which opens radially inward and which, together with the free end 17 of the anvil 4, forms a circumferential annular groove 1-4 in which several inserts 2 are fitted, each of these inserts 2 having, in a plan view, the shape of a segment of a circle. The inserts 2 can be present in any number, although three, four or five inserts 2 are preferably used. As is shown in FIGS. 13 and 15, the inserts 2 are L-shaped in cross section, wherein the radial limb 21 points radially outward and engages in an undercut 31 in the spring sleeve 3, as a result of which a captive locking means is formed. The bushing 1 is provided with milled cutouts 14, which are provided in a number corresponding to the number of the inserts 2 and in which the radial limb 21 of the inserts 2 that forms a projection is guided.

Figure 1:
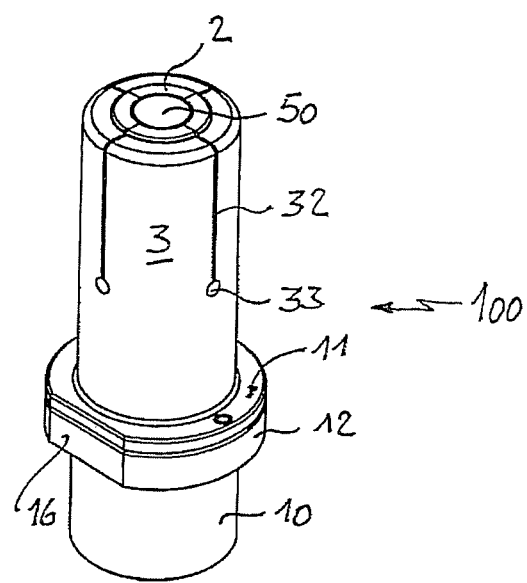

The flange 12 is provided with pegs 15 which project in the axial direction A and onto which the spring sleeve 3 with axial bores (not shown) is placed, such that an anti-rotation means is produced between the spring sleeve 3 and the main body 10 or the bushing 1. The spring sleeve 3 is provided with a plurality of slits 32 which extend in the axial direction A and end in a hole 33. The upper area of the spring sleeve 3 is radially elastic by virtue of the slits 32. The dividing angle between the slits 32 corresponds to the circle segment formed by the inserts 2 (cf. FIG. 1). The flange 12 is provided with a tangential flattened part 16, which is provided to prevent rotation of the die 100 in the punching tool.

Figure 18:
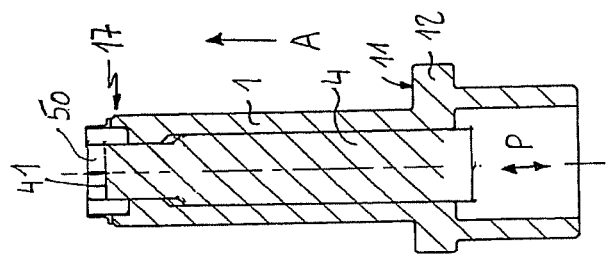
FIG. 18 shows the die according to FIG. 17 with the anvil displaced in the axial direction A.

The anvil 4 is arranged in the main body 10 displaceably in the axial direction A, as is indicated by the double arrow P, and is thus movable relative to the bushing 1. To achieve the axial displaceability, the anvil 4 can bear against a compression spring 5 provided in the main body 10, although it can also be driven hydraulically (not shown). The head 41 of the anvil 4, together with the inserts 2, forms the swage 50 (cf. FIG. 18). The inserts 2 are made of a harder material than the bushing 1. A powder-metallurgical steel or tool steel can be used for the main body 10. Spring steel is preferably used for the spring sleeve 3. The hardness or toughness of the inserts 2 can be adjusted according to the material that is to be joined, or suitably hard and tough inserts are selected. The die 100 is particularly well suited for use in clinching materials that have limited ductility.

The spring rate of the spring sleeve 3 is adjusted via the number and length of the slits 32. Although the anvil 4 is shown in the drawing as being displaceable in the axial direction A, it is equally possible for the anvil 4 to be formed in one piece with the main body 10. The bushing 1 and the anvil 4 are then one structural part in whose head 41 an axially milled annular groove is provided into which the inserts 2 are fitted, wherein the depth of the annular groove is less than the height of the inserts 2, such that the latter, together with the head 41 of the anvil 4, form the swage 50 (not shown). In the same way as for the anvil 4, it is likewise possible to use powder-metallurgical steels, tool steel, hard metals or ceramic materials for the inserts 2.

LIST OF REFERENCE SIGNS 1 bushing
1-4 annular groove
2 insert
3 spring sleeve
4 anvil
5 spring
10 main body
11 shoulder
12 flange
13 milled cutout
14 milled cutout
15 peg
16 flattened part
17 free end
21 radial limb/projection
31 undercut
32 slit
33 hole
41 bottom
50 swage
100 die
A axial direction
P double arrow

The invention claimed is:

1. Die for a joining tool, comprising:
   an anvil forming a bottom of a swage;
   a spring sleeve which surrounds the anvil, wherein the spring sleeve has a plurality of slits extending in an axial direction (A), said plurality of slits permitting a radial expansion of the spring sleeve;
   a bushing arranged between the anvil and the spring sleeve, wherein the bushing has at a free end inserts which surround the anvil, wherein the inserts are made of a harder material than the bushing.

2. Die according to claim 1, wherein the inserts are arranged in an annular groove formed by the anvil and the bushing.

3. Die according to claim 1, wherein each insert has at least one radially outwardly pointing projection which engages in an undercut formed in an area of the free end of the spring sleeve.

4. Die according to claim 3, wherein the projection is continuous in the circumferential direction.

5. Die according to claim 1 wherein the anvil is displaceable in the axial direction (A) with respect to the bushing.

6. Die according to claim 5, wherein displacement of the anvil takes place counter to a force of a spring.

7. Die according to claim 5, wherein the anvil is configured to be driven hydraulically.

8. Die according to claim 1 wherein the bushing is formed in one piece with a main body.

9. Die according to claim 1 wherein the anvil is formed in one piece with a main body.

10. Die according to claim 8, wherein the main body has a shoulder which acts in the axial direction (A) and on which the spring sleeve bears.

11. Die according to claim 10, wherein the shoulder has at least one peg which protrudes in the axial direction (A)

and secures the spring sleeve in terms of rotation, wherein the at least one peg engages in a corresponding recess provided in the spring sleeve.

12. Die according to claim 3, wherein the undercut is formed on the spring sleeve.

* * * * *

UNITED STATES PATENT AND TRADEMARK OFFICE
CERTIFICATE OF CORRECTION

PATENT NO. : 9,610,627 B2  
APPLICATION NO. : 15/177414  
DATED : April 4, 2017  
INVENTOR(S) : Unger Page 1 of 1

It is certified that error appears in the above-identified patent and that said Letters Patent is hereby corrected as shown below:

On the Title Page

Item (30), please add the claim of priority to German Application 10 2015 007 553.5 filed June 16, 2015.

Signed and Sealed this  
Thirtieth Day of May, 2017

Michelle K. Lee  
*Director of the United States Patent and Trademark Office*